(12) United States Patent
Frutschy et al.

(10) Patent No.: US 10,333,184 B2
(45) Date of Patent: Jun. 25, 2019

(54) HEAT FLUX ASSEMBLY FOR AN ENERGY STORAGE DEVICE

(71) Applicant: General Electric Company, Schenectady, NY (US)

(72) Inventors: Kristopher John Frutschy, Clifton Park, NY (US); James S. Lindsey, Schenectady, NY (US); David Charles Bogdan, Jr., Charlton, NY (US); James Thorpe Browell, Saratoga Springs, NY (US); Patrick Daniel Willson, Clifton Park, NY (US); Amin Ajdari, Albany, NY (US); Narayan Subramanian, Schenectady, NY (US); Michael Stanley Zanoni, Glens Falls, NY (US); Lukas Mercer Hansen, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 815 days.

(21) Appl. No.: 14/848,670

(22) Filed: Sep. 9, 2015

(65) Prior Publication Data

US 2017/0069939 A1    Mar. 9, 2017

(51) Int. Cl.
*H01M 10/627* (2014.01)
*H01M 10/613* (2014.01)
(Continued)

(52) U.S. Cl.
CPC ....... *H01M 10/627* (2015.04); *H01M 2/1077* (2013.01); *H01M 10/613* (2015.04);
(Continued)

(58) Field of Classification Search
CPC ............. H01M 10/613; H01M 10/615; H01M 10/617; H01M 10/627; H01M 10/63;
(Continued)

(56) References Cited

U.S. PATENT DOCUMENTS 3,649,366 A    3/1972  Howard et al.
5,994,669 A   11/1999  McCall
(Continued)

FOREIGN PATENT DOCUMENTS

JP    2003151620     5/2003
JP    2004111123     4/2004
WO    2015037438 A1  3/2015

OTHER PUBLICATIONS

International Search Report and Written Opinion issued in connection with corresponding PCT Application No. PCT/US2016/050706 dated Dec. 13, 2016.

*Primary Examiner* — Barbara L Gilliam
*Assistant Examiner* — Adam A Arciero
(74) *Attorney, Agent, or Firm* — Dority & Manning, P.A.

(57) ABSTRACT

The present disclosure is directed to a heat flux assembly for an energy storage device. The energy storage device includes a housing with a plurality of side walls that define an internal volume and a plurality of cells configured within the internal volume. The heat flux assembly includes a plurality of heat flux components configured for arrangement with the side walls of the housing of the energy storage device and one or more temperature sensors configured with each of the plurality of heat flux components. Thus, the temperature sensors are configured to monitor one or more temperatures at various locations in the plurality of heat flux components. The heat flux assembly also includes a controller configured to adjust a power level of each of the heat flux components as a function of the monitored temperature so as to reduce a temperature gradient or difference across the plurality of cells during operation of the energy storage device.

12 Claims, 13 Drawing Sheets

(51) Int. Cl.
*H01M 10/6568* (2014.01)
*H01M 10/6554* (2014.01)
*H01M 10/6569* (2014.01)
*H01M 10/6572* (2014.01)
*H01M 10/63* (2014.01)
*H01M 10/615* (2014.01)
*H01M 2/10* (2006.01)
*H01M 10/653* (2014.01)
*H01M 10/6556* (2014.01)
*H01M 10/6571* (2014.01)
*H01M 10/617* (2014.01)

(52) U.S. Cl.
CPC ....... *H01M 10/615* (2015.04); *H01M 10/617* (2015.04); *H01M 10/63* (2015.04); *H01M 10/653* (2015.04); *H01M 10/6554* (2015.04); *H01M 10/6556* (2015.04); *H01M 10/6568* (2015.04); *H01M 10/6569* (2015.04); *H01M 10/6571* (2015.04); *H01M 10/6572* (2015.04); *H01M 2220/10* (2013.01)

(58) Field of Classification Search
CPC ........... H01M 10/653; H01M 10/6554; H01M 10/6556; H01M 10/6568; H01M 10/6569; H01M 10/6571; H01M 10/6572; H01M 2220/10; H01M 2/1077
See application file for complete search history.

(56) References Cited

U.S. PATENT DOCUMENTS

| | | |
|---|---|---|
| 8,901,463 B2 | 12/2014 | Frutschy et al. |
| 2004/0099654 A1 | 5/2004 | Pais |
| 2013/0068755 A1* | 3/2013 | Frutschy ........... H01M 10/5083 219/542 |
| 2013/0071716 A1 | 3/2013 | Frutschy et al. |
| 2015/0108113 A1 | 4/2015 | Hioki et al. |

* cited by examiner

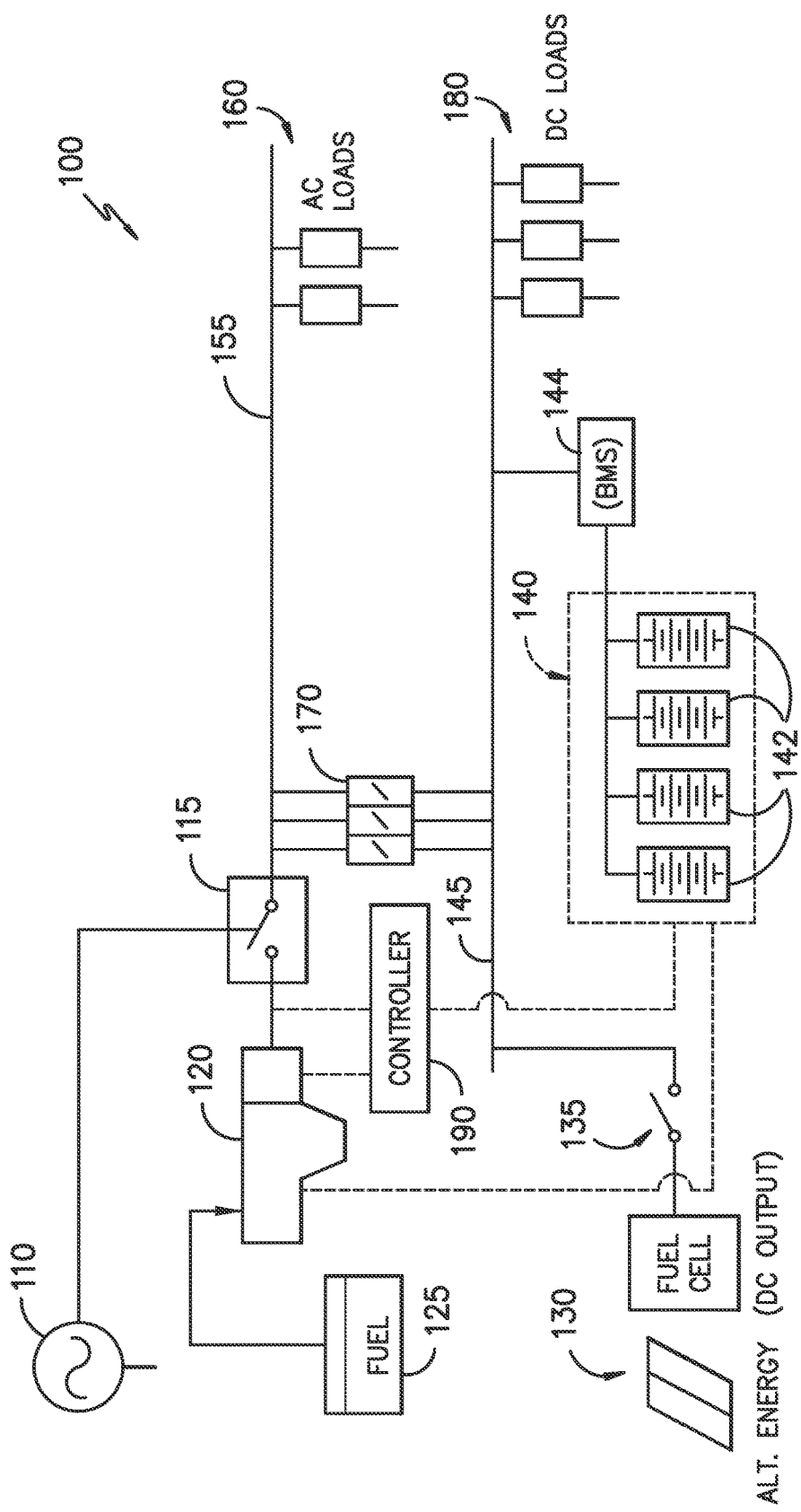
FIG. -1-

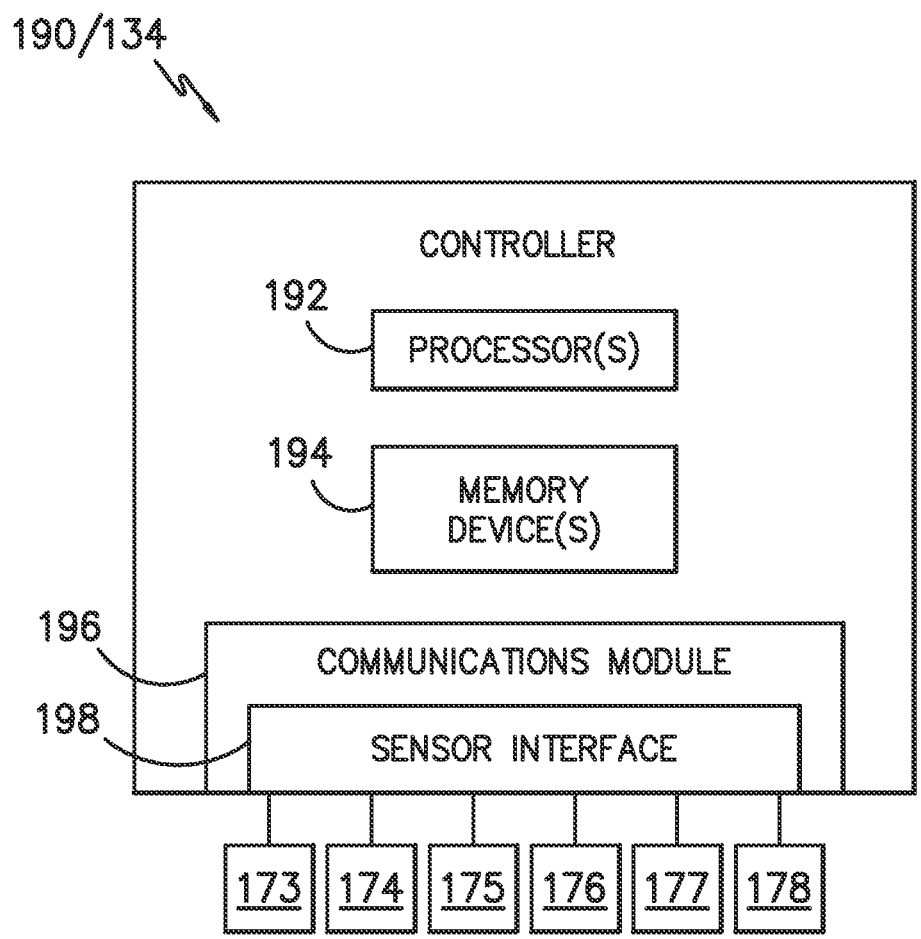
FIG. -2-

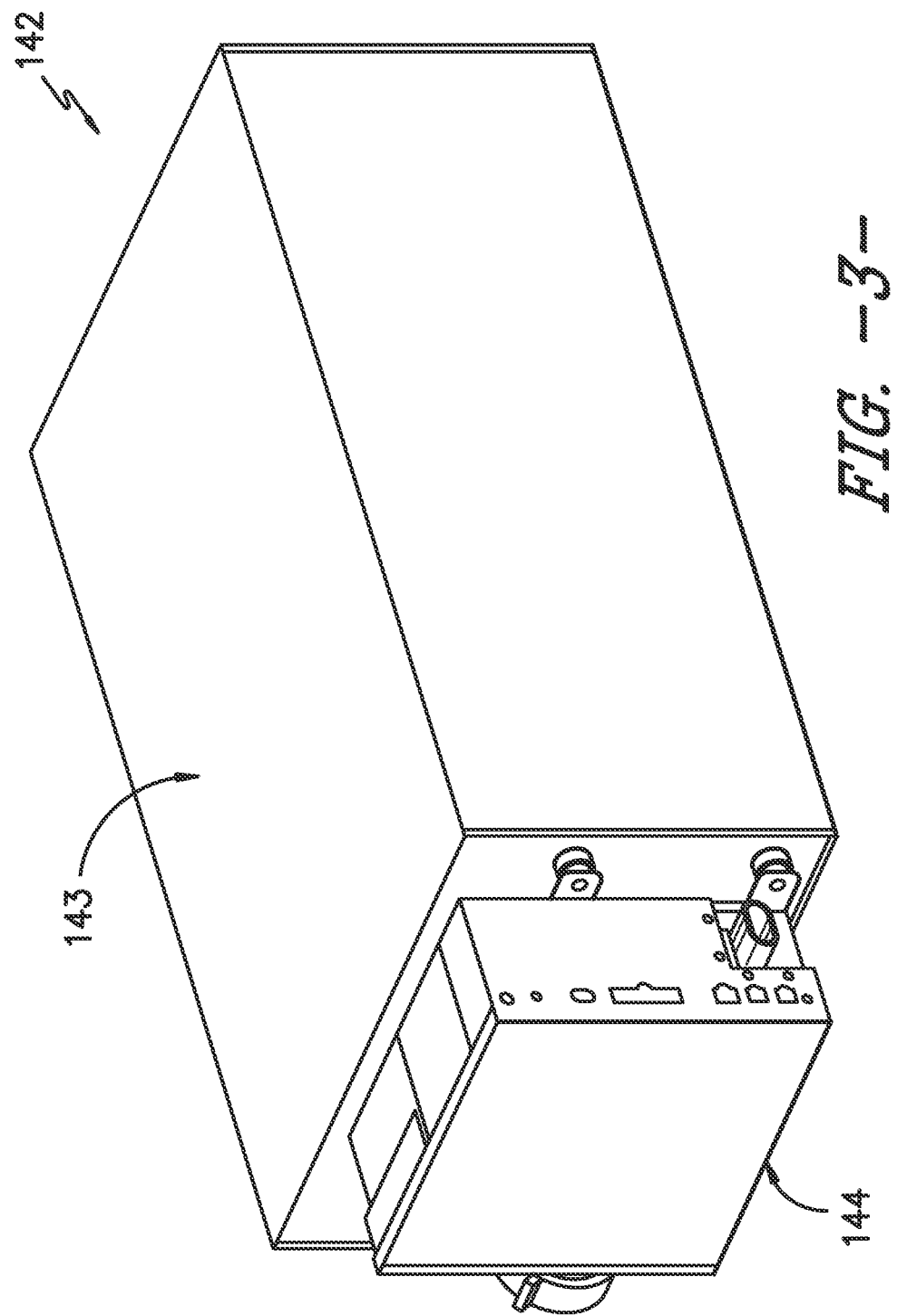

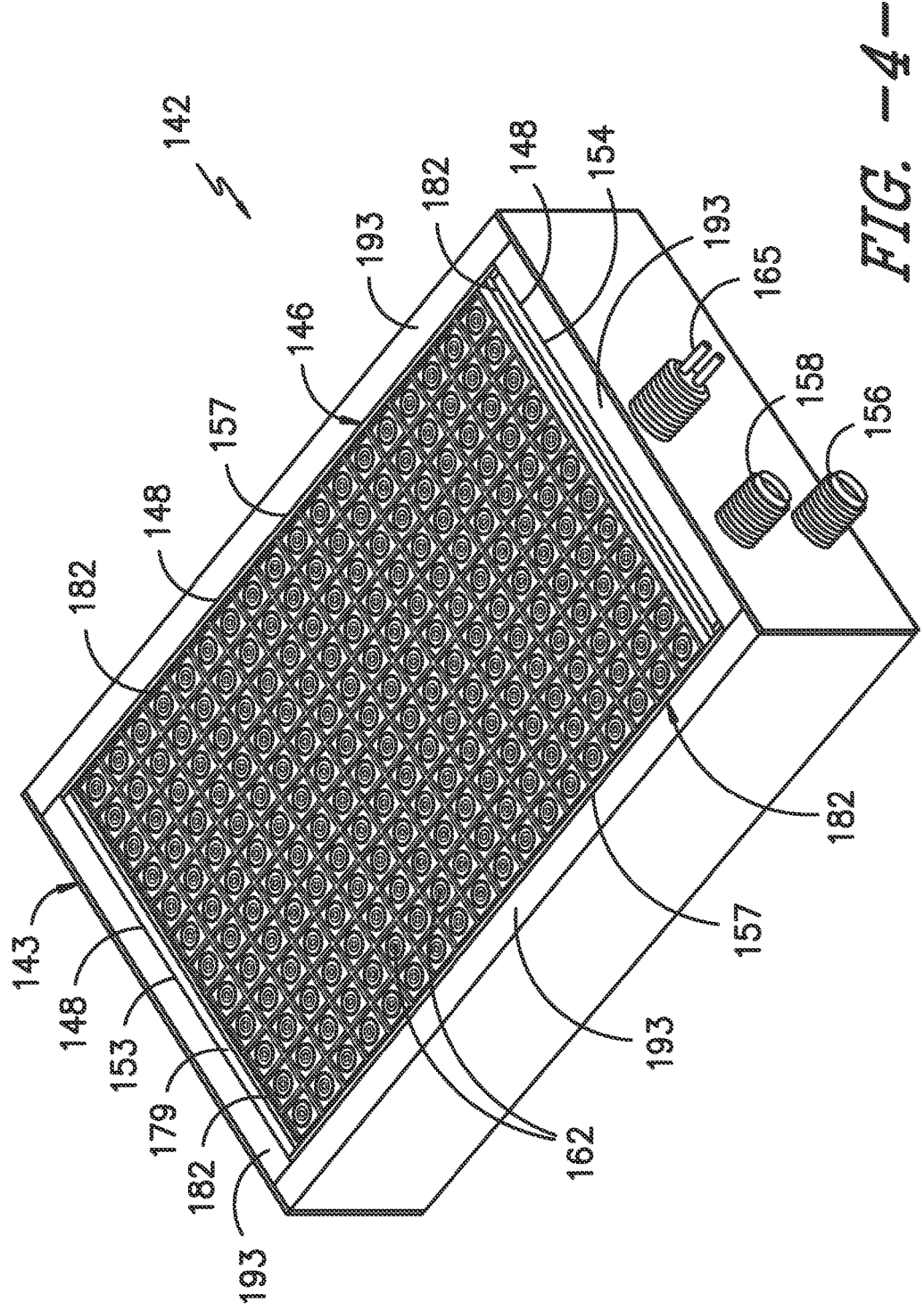
FIG. -4-

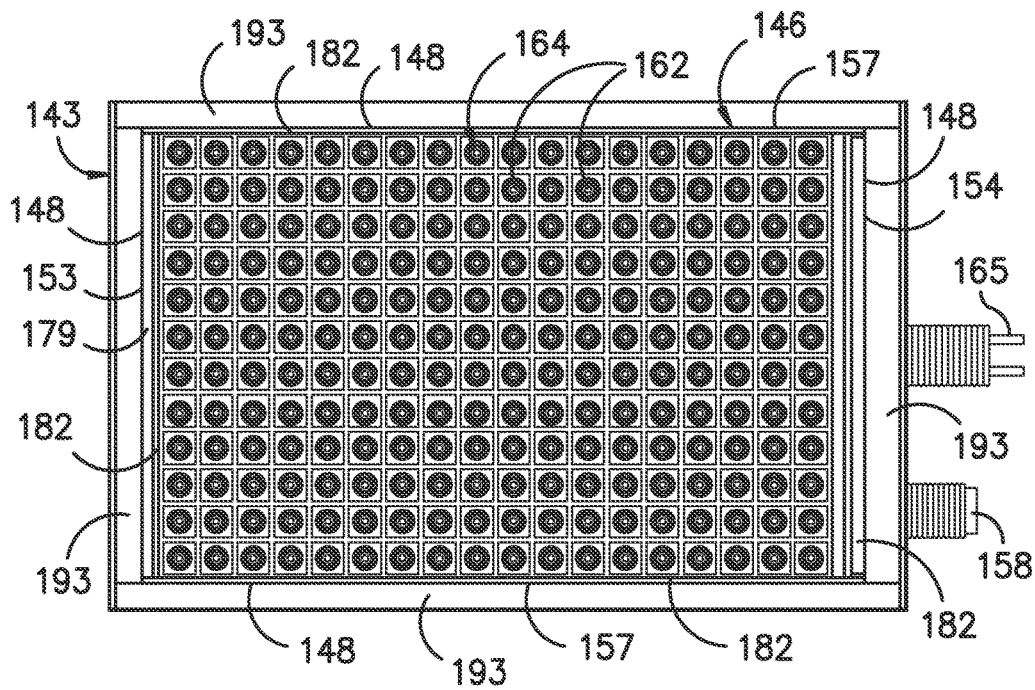
FIG. -5-
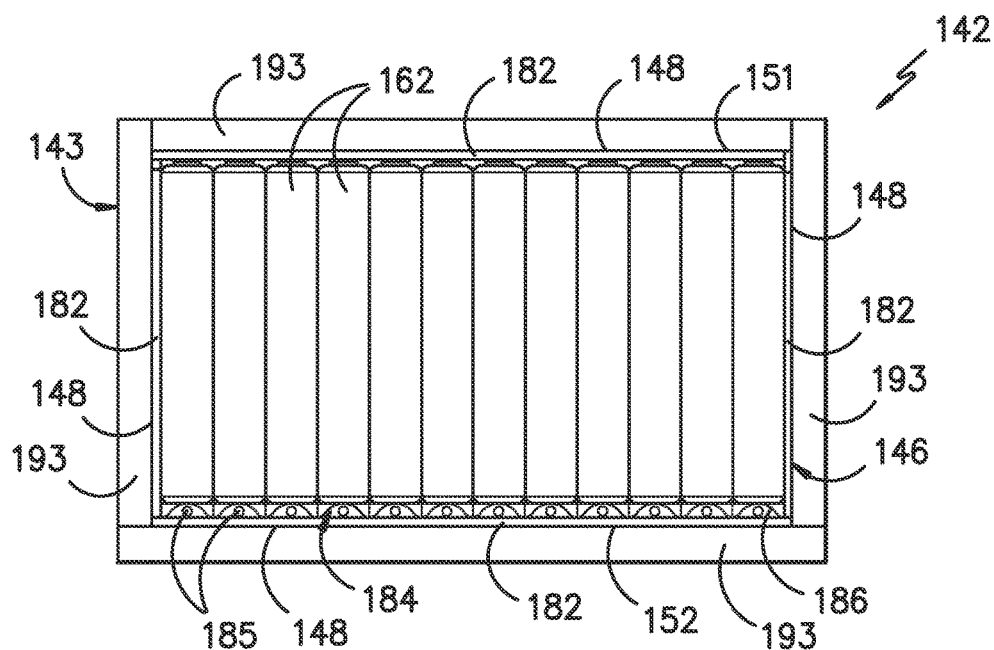
FIG. -6-

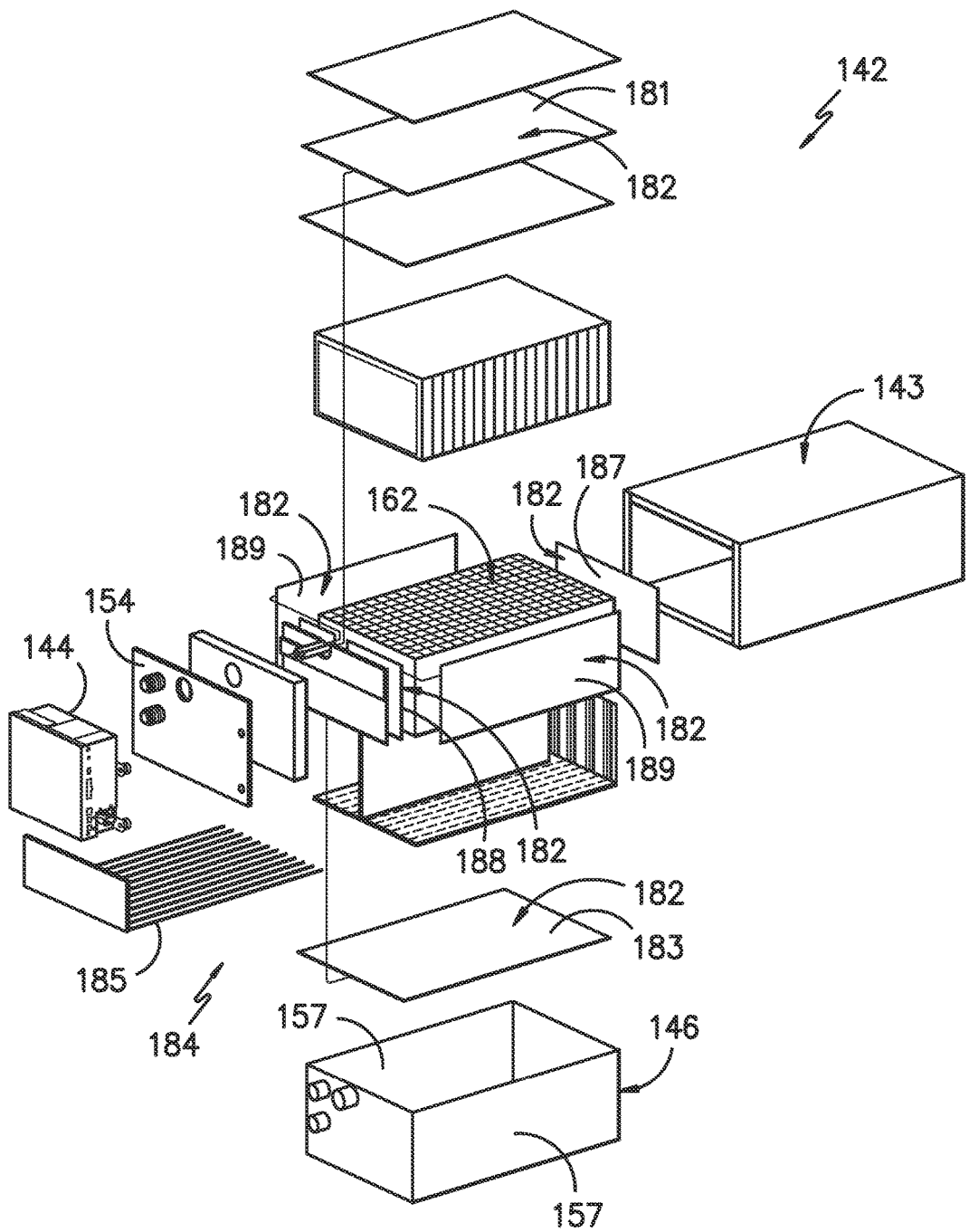
FIG. -7-

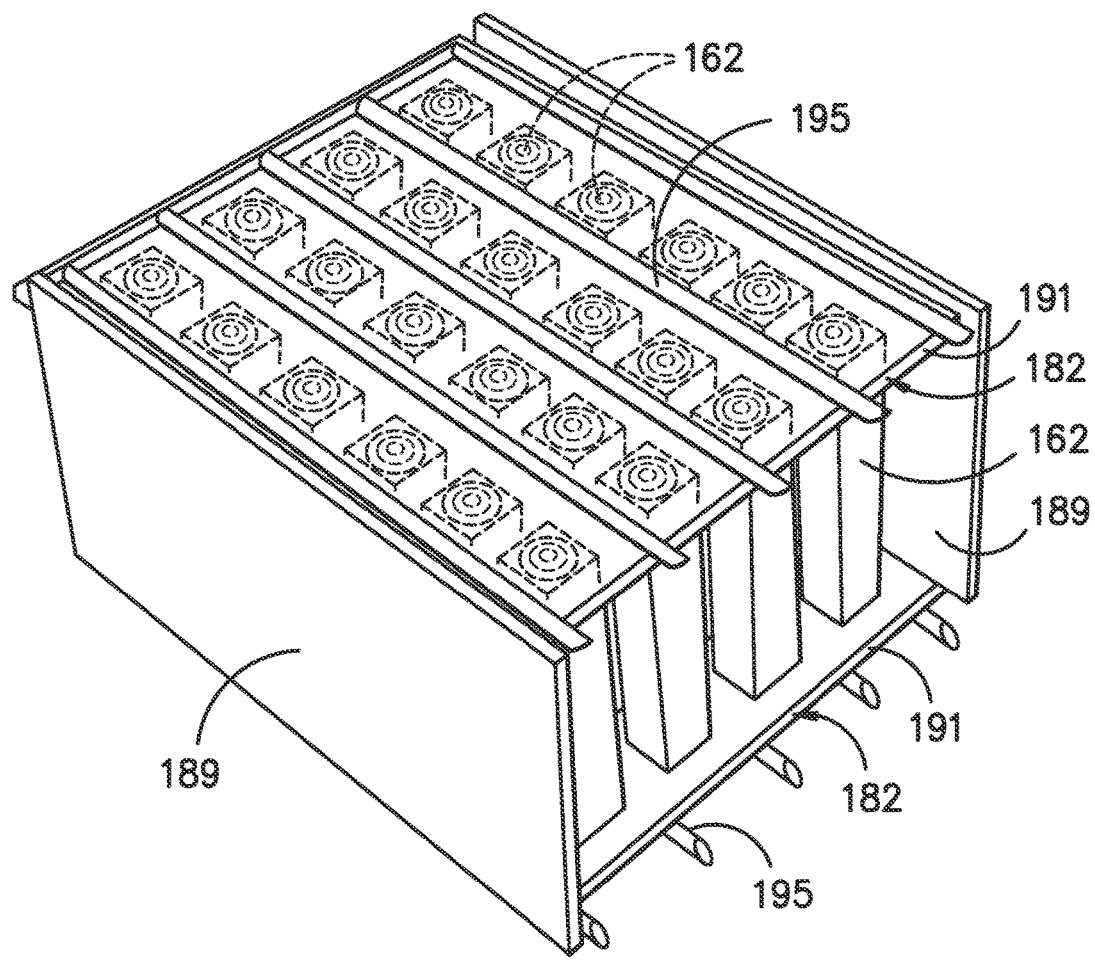
FIG. -8-

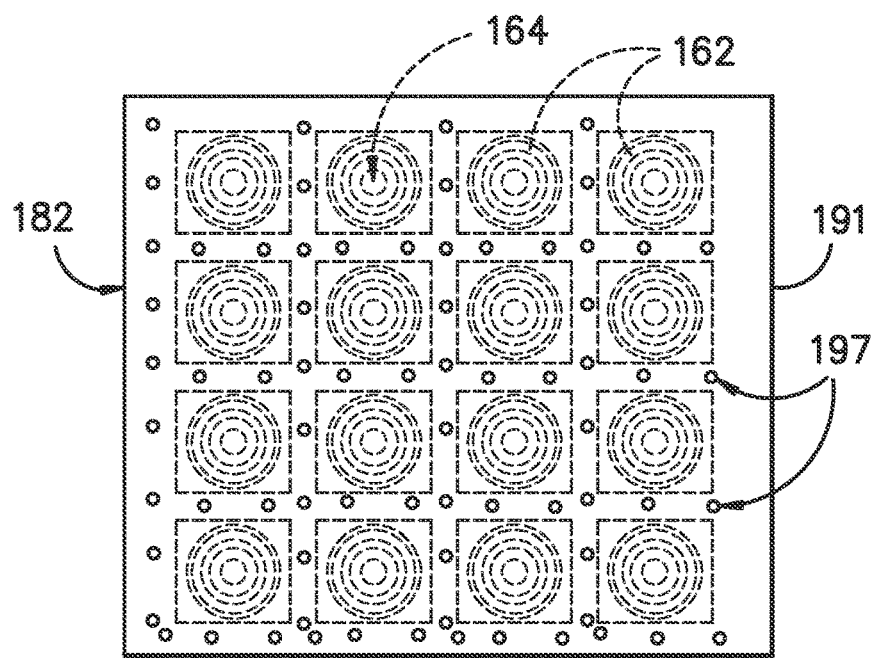
FIG. -9-
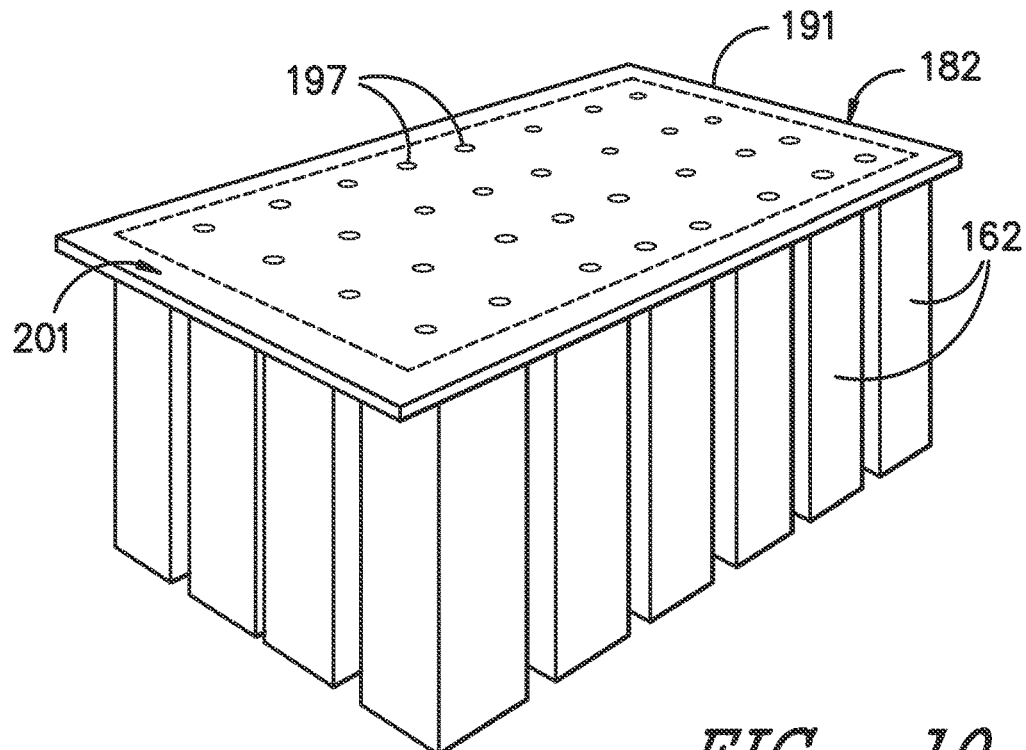
FIG. -10-

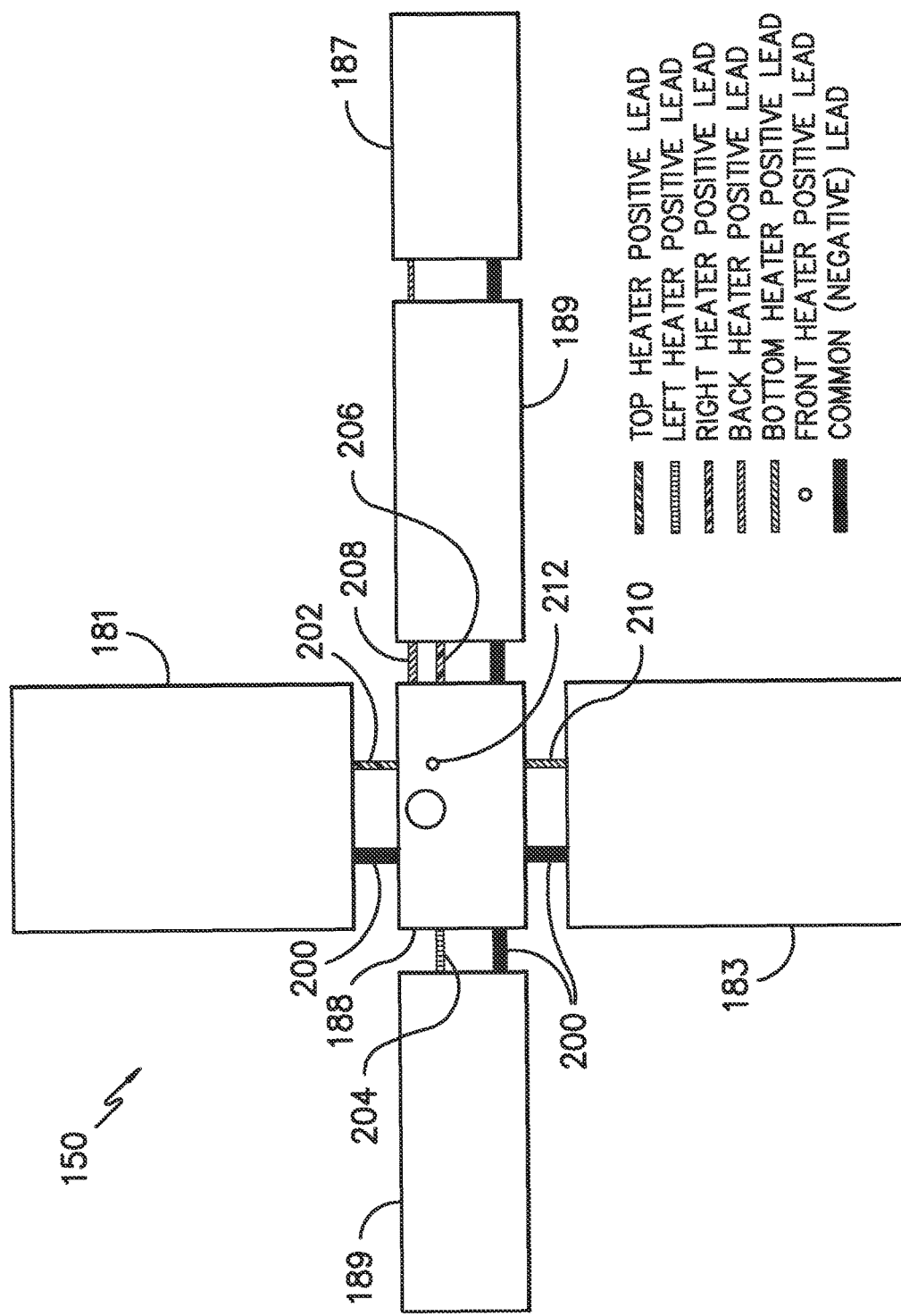
FIG. -11-

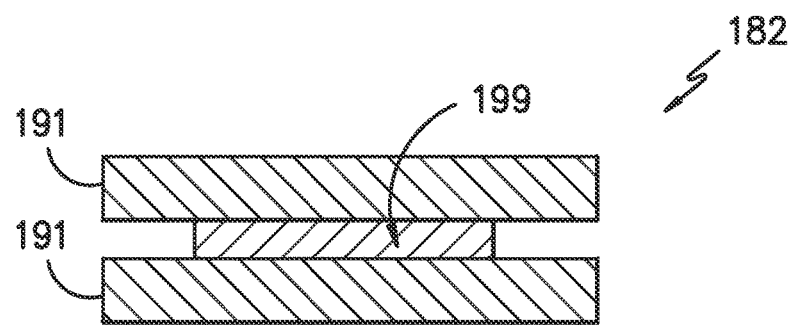
FIG. -12-
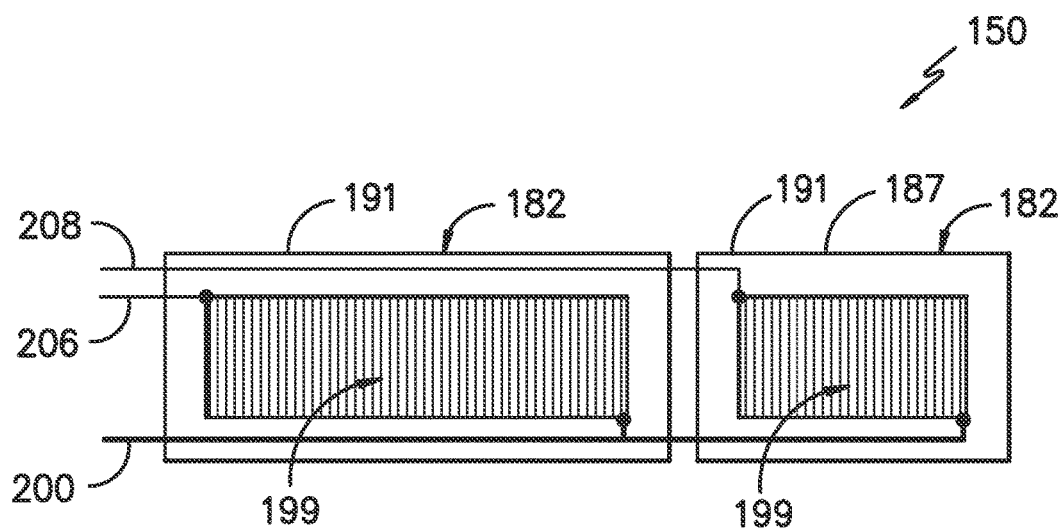
FIG. -13-

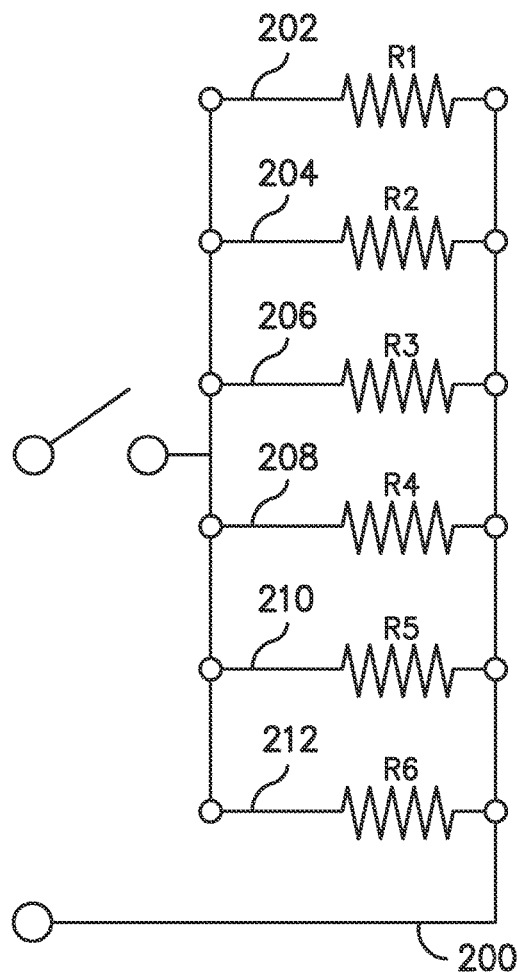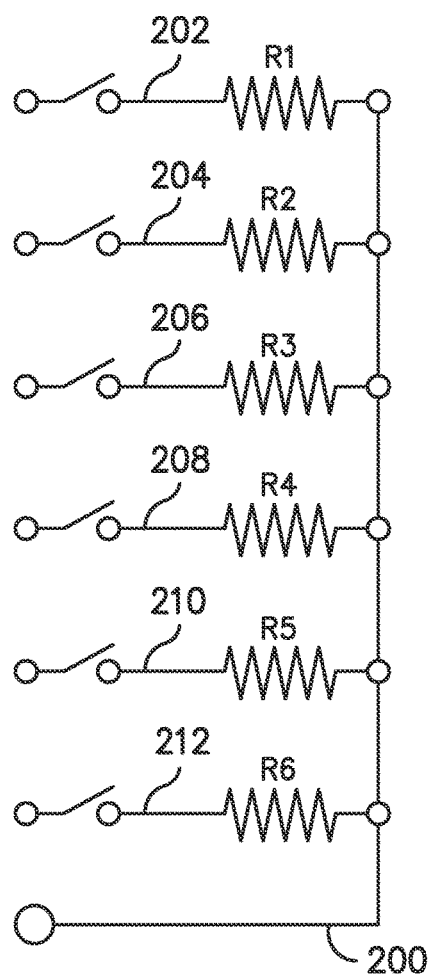
FIG. -14-  FIG. -15-

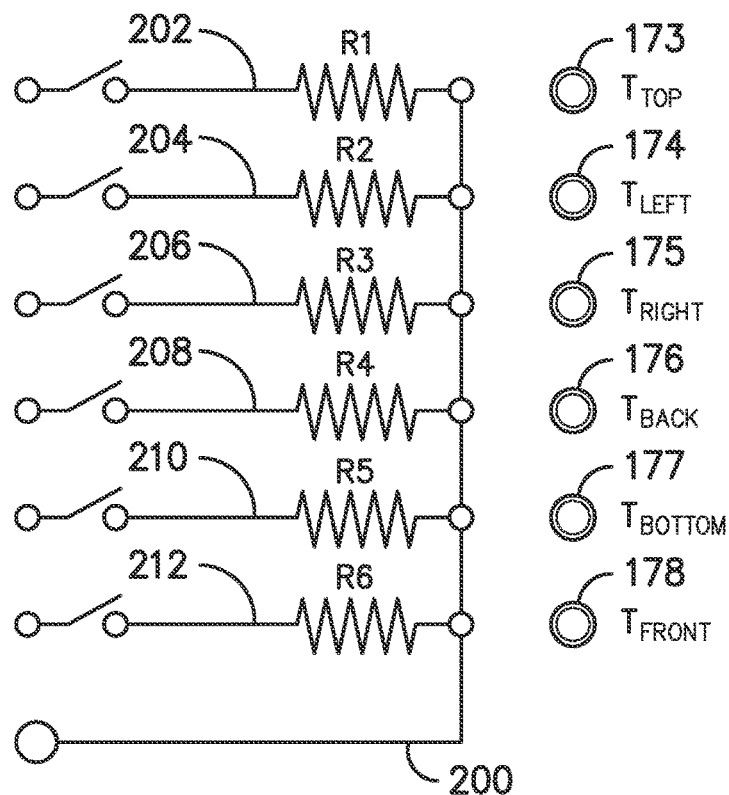
FIG. -16-
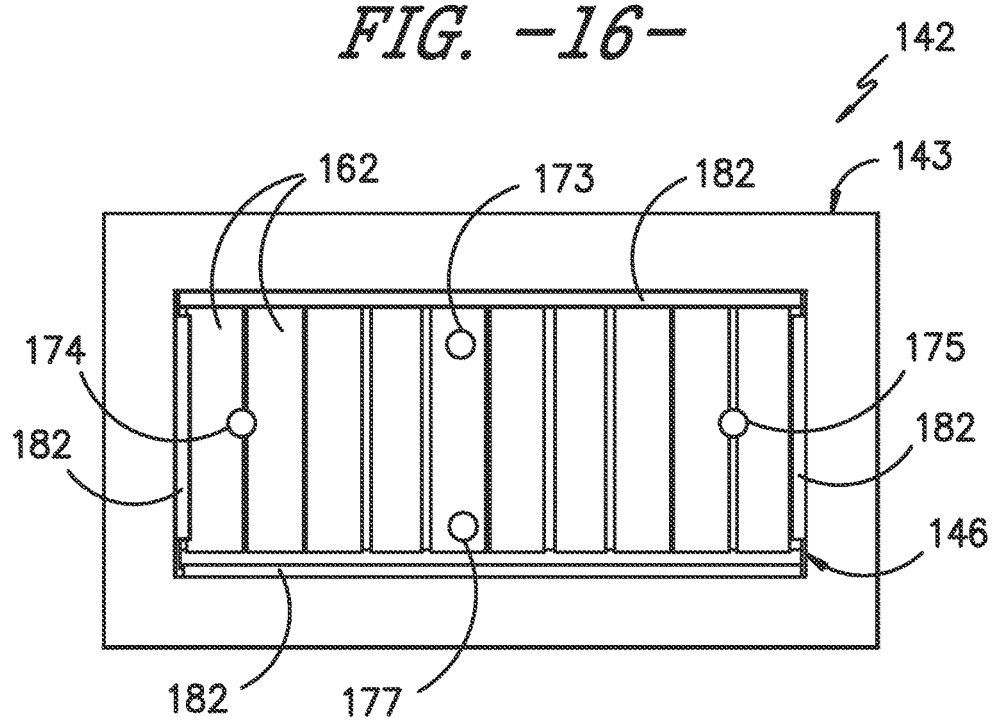
FIG. -17-

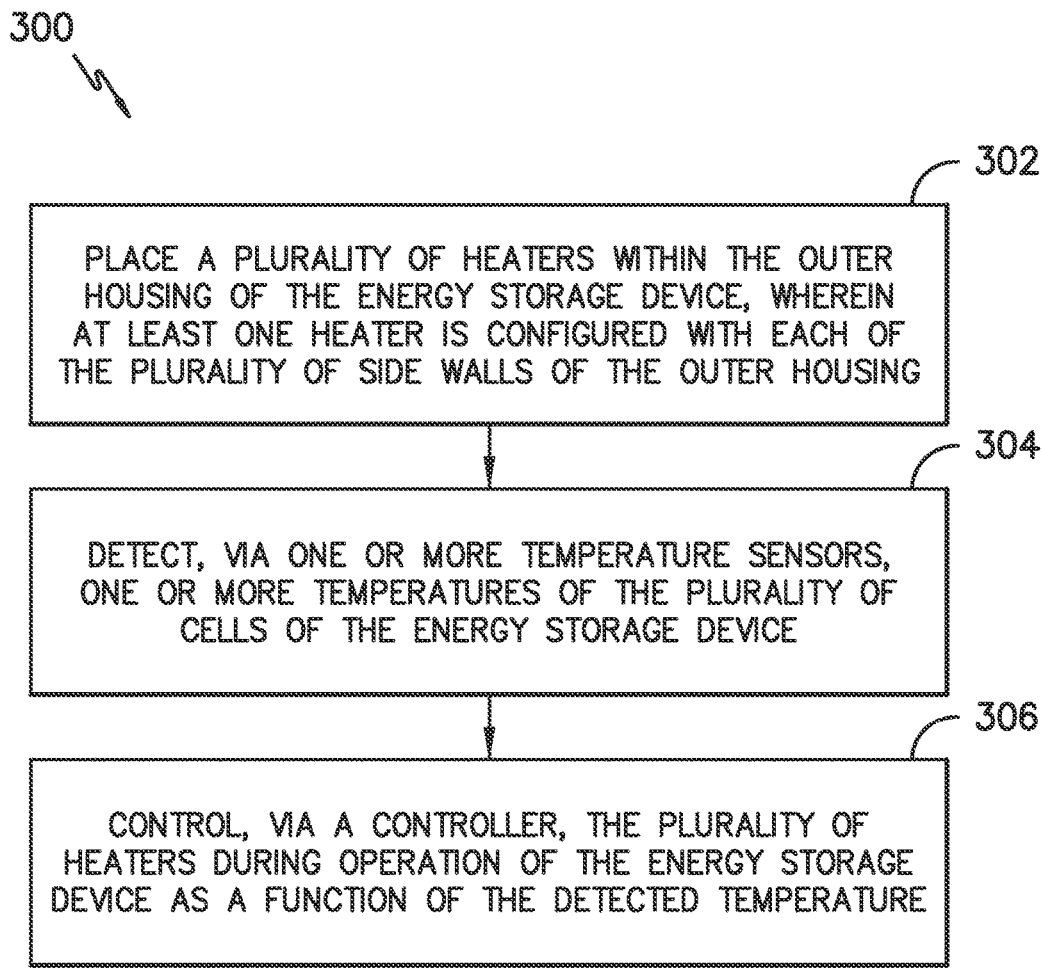
FIG. -18-

HEAT FLUX ASSEMBLY FOR AN ENERGY STORAGE DEVICE

FIELD OF THE INVENTION

The present disclosure relates generally to energy storage devices, and more particularly to a heat flux assembly for an energy storage device that reduces and/or eliminates the temperature gradient across the cell pack of the energy storage device by providing an isothermal interior.

BACKGROUND OF THE INVENTION

Typically, for an off-grid or weak-grid consuming entity the main power source may include a hybrid engine-generator/battery system that can be used in backup situations. For example, if power from the commercial utility is lost, the engine-generator set can be activated to supply power to the facility. Start-up of the engine-generator set, however, takes time; therefore, the battery can provide power during this transitional time period. If the engine-generator set fails to start (e.g., runs out of fuel, suffers a mechanical failure, etc.), then the battery is able to provide power for an additional period of time. In this way, electrical energy production does not have to be drastically scaled up and down to meet momentary consumption. Rather, production can be maintained at a more constant level. Thus, electrical power systems can be more efficiently and easily operated at constant production levels.

Other battery applications may include a grid-connected energy storage system and/or motive-based storage. For example, such grid-connected battery systems can be utilized for peak shaving for commercial/industrial plants, buffering peak loads in distribution grids, energy trading, buffering solar power for night time, upgrade of solar/wind power generation, and/or any other suitable application.

In the battery applications described above, as well as any other suitable battery applications, it is important to maintain a uniform temperature between the cells of the battery pack or module. For modern designs, the cooling hardware flows air underneath the battery pack and then over the top. However, since the airflow is typically not sealed, some of the air flows over the front cells as the air enters the battery, thereby causing the front cells to cool more than the remaining cells. When the cells get colder, their internal electrical resistances increase, which can drive a higher voltage across the cells during recharge at a fixed current flow. This higher voltage can damage the cold cells, which can degrade the performance and/or reliability of the battery.

Before the energy storage device is either discharged or charged, a temperature difference exists between the cells due to the heater position and/or thermal resistance paths between the cells and ambient environment. Most batteries spend a large portion of their service life with this steady-state temperature difference, which is generally referred to as the float temperature gradient. The magnitude of this temperature difference typically stays the same during discharging and charging, and only grows when cooling air is forced into the battery interior, typically during recharge. Hence, the energy storage device spends most of its service life in the float temperature gradient state, which is seen during float and discharge. Minimizing the float temperature gradient can thus significantly increase the service life of an energy storage device, Thus, it would be advantageous to provide a heat flux assembly for an energy storage device that minimizes the float temperature gradient and addresses the aforementioned issues.

BRIEF DESCRIPTION OF THE INVENTION

Aspects and advantages of the invention will be set forth in part in the following description, or may be obvious from the description, or may be learned through practice of the invention.

One example aspect of the present disclosure is directed to an energy storage system having reduced temperature variability between cells. More specifically, in certain embodiments, the energy storage system includes at least one energy storage device having a housing with one or more side walls that define an internal volume. The side walls include, at least, a bottom side wall and a front side wall. The energy storage device also includes a plurality of cells arranged in a matrix within the internal volume of the housing atop the bottom side wall. Further, the plurality of cells defines a top surface. In addition, the energy storage device includes a plurality of heat flux components arranged with the side walls and configured to reduce a temperature gradient (or difference) across the plurality of cells during operation of the energy storage device. More specifically, at least one heat flux component is configured with each of the plurality of side walls.

In one embodiment, in addition to the bottom and front side walls, the plurality of side walls may further include a top side wall, a rear side wall, and opposing side walls. In another embodiment, the heat flux components may include any suitable heater, cooling device, or combinations thereof. More specifically, in certain embodiments, the heaters may include a plate heater, a strip heater, a pocket heater, or similar. Further, the cooling devices may include a refrigeration evaporation plate, a thermo-electric cooler, a circulated chilled water, or similar.

In another embodiment, each of the heaters may be constructed, at least in part, of one or more electrical insulation plates. More specifically, in certain embodiments, the electrical insulation plate(s) may be constructed, at least in part, of a mineral material, such as mica. In addition, in particular embodiments, each of the heaters may include at least one heating wire mounted on one of the electrical insulation plates. More specifically, in certain embodiments, the heating wires may include a nichrome (i.e. a nickel-chrome-iron alloy) heating ribbon. In specific embodiments, the heaters may include a plurality of electrical insulation plates arranged in a stacked configuration with at least one heating wire sandwiched between the stacked electrical insulation plates.

In additional embodiments, the electrical insulation plate(s) may include one or more perforations configured to allow airflow within the energy storage device.

More specifically, in certain embodiments, the energy storage device may include a common lead wire that electrically couples each of the plurality of heat flux components to each other and to a power source. In addition, in further embodiments, the energy storage device may include a plurality of lead wires that electrically couple each of the plurality of heat flux components individually to the power source. More specifically, the plurality of lead wires may be electrically coupled to the heating wires or ribbons of each of the heat flux components. Thus, the heat flux components can be collectively or individually controlled, e.g. via a battery management system. For example, in one embodiment, individual control of the heaters can be achieved by understanding thermal flux during the operation of the energy storage device and pre-tuning the heater flux pattern through wire cross-sectional area, wire density, or both, thereby allowing automatic control.

Further, in certain embodiments, the energy storage device may also include one or more temperature sensors configured with each of the plurality of heat flux components so as to monitor the temperature of the plurality of cells. Thus, in certain embodiments, the energy storage device may also include a controller configured to adjust a power level to each of the heat flux components as a function of the monitored temperature.

In yet another embodiment, the energy storage device may also include at least one external heater configured at least partially outside of the top surface of the plurality of cells.

In another aspect, the present disclosure is directed to a heat flux assembly for an energy storage device. The energy storage device includes a housing with a plurality of side walls that define an internal volume and a plurality of cells configured within the internal volume. The heat flux assembly includes a plurality of heat flux components configured for arrangement with the side walls of the housing of the energy storage device. Further, the heat flux assembly includes one or more temperature sensors configured with each of the plurality of heat flux components. Thus, the temperature sensors are configured to monitor the temperature at various locations within the plurality of cells. The heat flux assembly also includes a controller configured to adjust a power level of each of the heat flux components as a function of the monitored temperature so as to reduce a temperature gradient across the plurality of cells during operation of the energy storage device. In one embodiment, the plurality of heat flux components may include at least one of a plate heater, a strip heater, or a pocket heater.

In yet another aspect, the present disclosure is directed to a method for reducing temperature variability in an energy storage device. The energy storage device includes a housing with a plurality of side walls that define an internal volume and a plurality of cells configured within the internal volume. Thus, the method includes placing a plurality of heat flux components within the housing of the energy storage device. More specifically, the method may include placing at least one heater with each of the plurality of side walls. The method also includes detecting, via one or more temperature sensors, one or more temperatures of the plurality of cells within the housing. Further, the method includes controlling, via a controller, the plurality of heat flux components during operation of the energy storage device as a function of the detected temperatures.

In one embodiment, the step of controlling, via the controller, the one or more temperatures during operation of the energy storage device may further include adjusting a power level of each of the heat flux components as a function of the monitored temperature.

In another embodiment, as mentioned, the heat flux components may include any suitable heater, cooling device, or combinations thereof. As such, in certain embodiments, the method may also include customizing a heat flux density or pattern of each heater. Such customization can be achieved by varying the cross-sectional area of the wire, by varying the wire density inside the heater, or both. Thus, in certain embodiments, the heat flux pattern of each heater may be the same. Alternatively, the heat flux pattern of each heater may be different. In another embodiment, the method may further include customizing the wire cross-sectional area and the wire winding density of each of the heating wires of the heaters based upon a heat flux requirement of each of the heaters.

In further embodiments, the method may also include electrically coupling, via a common lead wire, the plurality of heat flux components to each other and to a power source. In addition, the method may include electrically coupling, via a plurality of lead wires, each of the plurality of heat flux components individually to the power source. More specifically, in certain embodiments, the method may include electrically coupling each of the plurality of lead wires to heating wires of each of the heat flux components. Thus, the heat flux components are configured to provide heat or cooling to all sides of the energy storage device so as to create an isothermal temperature zone inside the device.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a schematic diagram of one embodiment of a hybrid power system configured to utilize one or more energy storage devices according to the present disclosure;

FIG. 2 illustrates a block diagram of one embodiment of a controller according to the present disclosure;

FIG. 3 illustrates a perspective view of one embodiment of an energy storage device according to the present disclosure;

FIG. 4 illustrates a perspective view of the energy storage device of FIG. 3 with the top side wall of the inner housing removed to further illustrate the plurality of cells contained therein;

FIG. 5 illustrates a top view of the energy storage device of FIG. 4;

FIG. 6 illustrates a front view of the energy storage device of FIG. 4;

FIG. 7 illustrates an exploded view of the energy storage device of FIG. 3;

FIG. 8 illustrates a perspective view of one embodiment of a heat flux assembly according to the present disclosure, particularly illustrating a plurality of electrical insulation plates;

FIG. 9 illustrates a top view of another embodiment of a heat flux assembly according to the present disclosure;

FIG. 10 illustrates a perspective view of yet another embodiment of a heat flux assembly according to the present disclosure;

FIG. 11 illustrates a schematic diagram of one embodiment of a heat flux assembly according to the present disclosure;

FIG. 12 illustrates a side view of one embodiment of a heater according to the present disclosure;

FIG. 13 illustrates a partial, schematic diagram of one embodiment of various heat flux components of the heat flux assembly of FIG. 11;

FIG. 14 illustrates a schematic diagram of one embodiment of a control scheme for a heat flux assembly according to the present disclosure, particularly illustrating single channel heater control;

FIG. 15 illustrates a schematic diagram of another embodiment of a control scheme for a heat flux assembly according to the present disclosure, particularly illustrating multi-channel heater control;

FIG. 16 illustrates the control scheme of FIG. 15, particularly illustrating a plurality of temperature sensors configured to provide measured temperatures thereto;

FIG. 17 illustrates a cross-sectional view of one embodiment of an energy storage device according to the present disclosure, particularly illustrating a plurality of heat flux components and associated temperature sensors configured therein; and FIG. 18 illustrates a flow diagram of one embodiment of a method for reducing temperature variability between cells of an energy storage device according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a heat flux assembly for an energy storage device that reduces temperature variability between cells. Thus, the present disclosure can be utilized in any suitable battery application, including but not limited to a consuming entity, a grid-connected energy storage system, and/or motive-based storage. In various embodiments, the energy storage device includes a housing having one or more side walls that define an internal volume. For example, in one embodiment, the side walls may include, at least, top and bottom side walls, front and rear side walls, and opposing side walls. The energy storage device also includes a plurality of cells, e.g. sodium nickel chloride cells, arranged in a matrix within the internal volume of the housing atop the bottom side wall. In addition, the energy storage device includes a plurality of heat flux components (e.g. heaters or cooling devices) arranged with the side walls and configured to reduce a temperature gradient across the plurality of cells during operation of the energy storage device. More specifically, at least one heater is configured with each of the plurality of side walls, thereby providing heat to all sides of the energy storage device so as to create an isothermal temperature zone inside the device.

In many instances, long-duration, high-power battery cycles are known well in advance. Thus, existing algorithms start cooling after the energy storage device has started heating. The present disclosure connects the heating decision to scheduled high-power battery cycling. More specifically, the control scheme of the present disclosure shuts down heating in advance of high-power operation that can normally induce the need for cooling. Such operation extends the ability of the energy storage device to run at higher power without active cooling, which then drives higher temperature differences between the hottest and coolest cells.

The present disclosure has many advantages not present in the prior art. For example, the heat flux assembly reduces the temperature gradient across the cells during battery float and/or discharge. Further, in certain embodiments, the heat flux assembly can be implemented without modifying the battery housing. In addition, the heat flux assembly can be implemented without modifying the battery management system. Moreover, the heat flux assembly provides an energy storage device with a lower battery float temperature because of the lower temperature gradient. Further, a lower temperature gradient also slows cell degradation and thus improves battery life.

Referring now to the drawings, FIG. 1 is an illustration of one embodiment of a hybrid grid power system 100 that can benefit from the energy storage device 142 of the present disclosure. In addition, it should be understood by those of ordinary skill in the art that the energy storage device 142 of the present disclosure can be used in any other suitable battery application, e.g. grid-connected energy storage, motive-based storage, and/or similar, and the embodiment of FIG. 1 is provided for illustrative purposes only. As shown, FIG. 1 depicts multiple sources of power including an AC power grid 110, an engine-generator power source or engine-generator set (EGS) 120, alternative energy source 130, and a battery power source 140, which, as shown, includes a plurality of energy storage devices 142. A transfer switch 115 allows transfer of operation between the AC power grid 110 and the EGS 120, as well as other AC electrical power that may be available. The EGS 120 typically runs on fuel (e.g., diesel fuel) provided by a fuel source 125 (e.g., a storage tank). An availability switch 135 allows for alternate energy sources 130 (e.g. solar, wind, or fuel cell), if available, to be switched in to a DC bus 145 or an AC bus 155 of the power system 100 as well. If switching into the AC bus 155, an inverter 170 (described below) can be coupled between the alternate energy source 130 and the AC bus 155.

The battery power source 140 is an electrical power source. More specifically, in certain embodiments, the battery power source 140 may include an energy storage system having one or more energy storage devices, e.g. battery modules 142. Such battery modules 142 may contain any suitable batteries known in the art. For example, in various embodiments, the battery modules 142 may contain one or more sodium nickel chloride batteries, sodium sulfur batteries, lithium ion batteries, nickel metal hydride batteries, fuel battery cells, or similar. More specifically, in certain embodiments, the battery modules 142 may include a plurality of sodium nickel chloride cells 162 arranged in a matrix, e.g. in a plurality of rows and columns. In addition, in particular embodiments, each of the cells 162 may include a ceramic electrolyte material that separates the electrodes of adjacent cells. Thus, during charging, chloride ions may be released from sodium chloride and combined with nickel to form nickel chloride. The sodium ions that remain can move through the electrolyte into a reservoir. When the battery produces power, the ions move back through the electrode and the reaction is reversed. The process typically occurs at about 300 degrees Celsius (° C.) inside an insulated container or inner housing 146 (FIGS. 3-7). Sodium nickel chloride batteries are particularly suitable due to their short charge times that can drive the EGS 120 to peak efficiency, thereby reducing fuel costs for the power system 100. In addition, sodium nickel chloride battery performance is not affected by ambient temperature; therefore, such batteries can be used at sites with extreme temperature variations. Further, the battery modules 142 are typically available in multiple size ranges, namely kWh or MWh.

Referring still to FIG. 1, the AC bus 155 provides AC power to drive AC loads 160 of the system such as, for example, lighting and/or air conditioning for the power system 100. Furthermore, the AC bus 155 can provide AC power to a bi-directional inverter 170 which converts AC power to DC power which provides DC power to the DC bus 145 to drive DC loads 180 of the power system 100. Example DC loads of the power system 100 include radios, switches, and amplifiers of the power system 100. The DC bus 145 also provides DC power from the inverter 170 to charge the battery power source 140 and provides DC power from the battery power source 140 to the DC loads 180 as the battery power source 140 discharges. The inverter 170 may regulate DC power from a DC electrical power source (e.g., a solar energy system or a fuel cell energy system) instead of an AC electrical power source. In general, a primary power source may provide AC or DC electrical power that is used by an energy storage device (e.g., by the DC battery power source 140) of the power system 100.

During operation of the hybrid power system 100, when the EGS 120 is on, the EGS 120 is configured to provide power to the DC loads 180 and to the battery power source 140 during a charging part of the cycle. When the EGS 120 is off, the battery power source 140 is configured to provide power to the DC loads 180 during a discharging part of the cycle. Further, the battery power source 140 may be controlled by a battery management system (BMS) 144. As used herein, the BMS 144 generally refers to any electronic system that manages a rechargeable battery module (e.g. cell or battery pack), such as by protecting the battery module from operating outside a safe operating mode, monitoring a state of the battery module, calculating and reporting operating data for the battery module, controlling the battery module environment, and/or any other suitable control actions. For example, in several embodiments, the BMS 144 is configured to monitor and/or control operation of one or more energy storage devices (e.g. the battery modules 142). Further, the BMS 144 may be configured to communicate with the EGS 120 by sending a start-up command so as to start-up the engine of the EGS 120 in accordance with control logic of the BMS 144. In addition, the BMS 144 may be, for example, a logic controller implemented purely in hardware, a firmware-programmable digital signal processor, or a programmable processor-based software-controlled computer.

The power system 100 may also include a controller 190 that is configured to monitor and/or control various aspects of the power system 100 as shown in FIGS. 1 and 2. For example, the controller 190 may be configured to command the engine of the EGS 120 to turn on or off in accordance with control logic of the controller 190. In accordance with various embodiments, the controller 190 may be a separate unit (as shown) or may be part of the BMS 144 of the battery power source 140. More specifically, as shown in FIG. 2, a block diagram of one embodiment of the controller 190 (or BMS 144) according to the present disclosure is illustrated. As shown, the controller 190 may include one or more processor(s) 192 and associated memory device(s) 194 configured to perform a variety of computer-implemented functions (e.g., performing the methods, steps, calculations and the like, storing relevant data as disclosed herein). Additionally, the controller 190 may also include a communications module 196 to facilitate communications between the controller 190 and the various components of the power system 100. Further, the communications module 196 may include a sensor interface 198 (e.g., one or more analog-to-digital converters) to permit signals transmitted from one or more sensors (e.g. temperature sensors 173, 174, 175, 176, 177, 178) to be converted into signals that can be understood and processed by the processors 192. It should be appreciated that the sensors may be communicatively coupled to the communications module 198 using any suitable means. For example, the sensors may be coupled to the sensor interface 198 via a wired connection. However, in other embodiments, the sensors may be coupled to the sensor interface 198 via a wireless connection, such as by using any suitable wireless communications protocol known in the art. As such, the processor 192 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 194 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 194 may generally be configured to store suitable computer-readable instructions that, when implemented by the processor(s) 192, configure the controller 190 to perform various functions as described herein.

Referring now to FIGS. 3-20, various views of an energy storage device 142 having a heat flux assembly 150 that provides reduced temperature variability between cells according to the present disclosure is illustrated. As shown particularly in FIGS. 3-4 and 6-7, the energy storage device 142 includes an inner housing 146 contained within an outer housing 143. More specifically, as shown, the inner housing 146 includes one or more side walls 148 that define an internal volume 149 thereof. In addition, as shown in FIGS. 4-7, one or more sheets of insulation material 193 may be provided between the side walls 148 of the inner housing 146 and the outer housing 143. More specifically, as shown, the side walls 148 include, at least, a bottom side wall 152, a front side wall 154, a top side wall 151, a rear side wall 153, and opposing vertical side walls 157. Further, as shown, the front side wall 154 has an air inlet 156 and an air outlet 158. In addition, as shown, the energy storage device 142 also includes a plurality of cells 162 (e.g. sodium nickel chloride cells) arranged in a matrix within the internal volume 149 of the inner housing 146, e.g. atop the bottom side wall 152 thereof. Further, the cells 162 define a top surface 164. Moreover, the energy storage device 142 may also include an electrical connector 165 configured to electrically couple the energy storage device 142 to a power source (e.g. the BMS 144) as described herein.

Referring particularly to FIGS. 5-7, the energy storage device 142 may also include an airflow distribution network 184 configured with the bottom side wall 152 of the inner housing 146. Further, as shown, the airflow distribution network 184 may extend longitudinally from the rear side wall 153 to the front side wall 154 of the inner housing 146. Thus, the airflow distribution network 184 is configured to direct airflow from the air inlet 156 (e.g. via a blower not shown) to the rear side wall 153 through a rear airflow channel 179 of the inner housing 146 and then to the top surface 164 of the cells 162. More specifically, in certain embodiments, the airflow distribution network 184 may include one or more airflow pipes 185 covered by a sump plate 186. In addition, the sump plate 186 may include a plurality of perforations and/or a corrugated profile defining channels for the one or more airflow pipes 185. For example, in one embodiment, the airflow distribution network 184 may include cooling airflow pipes contained within perforated sump plate channels. Thus, the perforations are configured to allow cooling air to flow through the energy storage device 142 with minimal pressure drop. In addition, in one embodiment, the sump plate 186 may be configured atop the plurality of airflow pipes 185. Alternatively, the sump plate 186 may have an alternating configuration with every other airflow pipe 185 configured atop the sump plate 186 with alternating airflow pipes 185 configured underneath the sump plate 186.

Referring generally to FIGS. 3-17, the heat flux assembly 150 of the energy storage device 142 includes a plurality of heat flux components 182 arranged with the side walls 148 of the inner housing 146. Thus, the heat flux components 182 are configured to reduce a temperature gradient across the plurality of cells 162 during operation of the energy storage device 142. In certain embodiments, the heat flux components 182 may include any suitable heater, cooling device, or combinations thereof. More specifically, as shown, at least one heat flux component 182 may be configured with each of the plurality of side walls 148. For example, as shown in FIG. 7, a top heater 181 is configured with the top side wall 151 of the inner housing 146. Similarly, as shown in FIGS. 6 and 7, a bottom heater 183 is configured with the bottom side wall 152 of the inner housing 146. Further, a front heater 188 is configured with the front side wall 154 of the inner housing 146. In addition, opposing side heaters 189 are configured with the opposing side walls 157, i.e. the right and left vertical side walls, of the inner housing 146. Thus, the heat flux assembly 150 of the present disclosure provides heat or cooling to all sides of the battery pack so as to create an isothermal temperature zone inside the pack. In alternative embodiments, less than all side walls may include a heater 182.

Referring particularly to FIGS. 7 and 11-13, each of the heaters 182 may be constructed, at least in part, of one or more electrical insulation plates 191. Further, it should be understood that the electrical insulation plates 191 as described herein may be constructed of any suitable electrical insulation material. For example, as mentioned, one or more of the electrical insulation plates 191 may be constructed, at least in part, of a mineral material. In such embodiments, the mineral material may include mica. Further, the electrical insulation plates 191 as described herein may have any suitable thickness. For example, in certain embodiments, the thickness of the electrical insulation plates 191 may range from about 0.5 millimeters (mm) to about 2 mm. Further, the material or thickness of the electrical insulation plates 191 can also be varied to control overall heating.

In addition, as shown in FIG. 12, each of the heaters 182 may include a plurality of electrical insulation plates 191 arranged in a stacked configuration with at least one heating wire 199 or ribbon sandwiched between the stacked electrical insulation plates 191. More specifically, in specific embodiments, the heating wire(s) 199 may be a nichrome (i.e. a nickel-chrome-iron alloy) heating ribbon arranged in a predetermined pattern between the electrical insulation plates 191. In addition, as shown, in FIG. 13, the heating wire 10 of each heater 182 may be customized for each side wall of the energy storage device 142. For example, in certain embodiments, the heat flux distribution of the individual heaters 182 may be determined by wire winding density or spacing. For example, in certain embodiments, the heat flux distribution for the individual heaters 182 may be determined by the wire cross-sectional area. Thus, in certain embodiments, individual control of the heaters can be achieved by understanding thermal flux of the heaters during the operation of the energy storage device 142 and pre-tuning the heaters through wire winding density, wire cross-sectional area, or both, thereby allowing automatic control.

In alternative embodiments, as shown in FIG. 8, the heat flux components 182 may include one or more perforations 197 or holes configured to allow airflow within the energy storage device 142, e.g. between the cells 162. In such embodiments, the holes 197 may be punched into the electrical insulation plates 191 so as to provide individual or cell-level temperature control.

In additional embodiments, each of the heaters 182 may also include one or more heating coils 195 arranged on the electrical insulation plates 191. Thus, the perforations 197 allow air to flow freely between the cells 162 thereby leading to more adequate cooling. More specifically, as shown in FIGS. 8 and 12, the side heaters 189 may be mounted on solid strips of mica, whereas the top and bottom heaters 181, 183 may be strip-type heaters. In such an embodiment, main heating and control may be provided by the top and bottom heaters 181, 183, whereas the side heaters 189 may be used for auxiliary heat to maintain the side temperature at individual set points. It should also be understood that any combination of the electrical insulation plates 191 as described herein may be further utilized.

More specifically, as shown in FIGS. 8 and 10, the heaters 182 may be strip heaters, plate heaters, or pocket heaters having one or more heating coils 195 configured thereon. As used herein, a pocket heater generally encompasses an individual heating element that can be mounted on top of each cell, i.e. the pocket heater may fit like a pocket atop each of the cells 162, thereby allowing for finer control at a cell level.

Referring now to FIG. 10, the energy storage device 142 may also include at least one external heater 201 configured at least partially outside of the top surface 164 of the plurality of cells 162. Such an embodiment employs two heaters, e.g. one for outside of the cells 162 and the other for inside of the cells 162. Thus, in certain embodiments, the external heater(s) 201 can be mounted on the internal heater 182. More specifically, the internal heaters 182 can be mounted on an electrical insulation plate or sheet on the inner periphery, e.g. as indicated by hole 203. Thus, the external heater 201 is configured to provide finer control of the battery temperature and ensures less heating outside versus inside. In addition, such external heaters 201 may be mounted on two different electrical insulation plates and/or in one sheet with separation.

Referring particularly to FIGS. 11-16, the heat flux assembly 150 may also include a common negative lead wire 200 that electrically couples each of the plurality of heat flux components 182 to each other and/or to a power source (e.g. the BMS 144). In addition, in certain embodiments, the heat flux assembly 150 may include a plurality of lead positive wires (e.g. wires 202, 204, 206, 208, 210, and 212) that electrically couple each of the plurality of heat flux components 182 individually to a power source. More specifically, the plurality of lead wires may be electrically coupled to the heating wires 199 or ribbons of each of the heat flux components 182. Thus, the heat flux components 182 can be collectively or individually controlled, e.g. via the BMS 144.

In addition, as shown in FIGS. 16-17, the energy storage device 142 may include one or more temperature sensors 173, 174, 175, 176, 177, 178 configured with the plurality of heat flux components 182. Thus, in further embodiments, the controller 190 (or BMS 144) may be configured to receive monitored temperature measurements from the temperature sensors 173, 174, 175, 176, 177, 178 and adjust a power level of one or more of the heat flux components 182 as a function of the measurements. More specifically, the BMS 144 may be configured with a heater control algorithm that continuously adjusts power to each heater 182 to reach a set-point (i.e. average) temperature with minimal cell pack temperature gradient. Thus, in certain embodiments, the BMS 144 may be programmed with six-channel heater control having six-temperature sense feedback. More specifically, multiple temperature sense points, as shown in FIG. 20, can allow continuous minimization of the temperature gradient in the cells 162. It should be understood that the temperature sensors 173, 174, 175, 176, 177, 178 may include any suitable temperature sensing device, including but not limited to resistive temperature devices (RTD), thermocouples (T/C), fiber optics, or any other suitable technique to measure temperature at multiple points across battery cell pack.

More specifically, as shown in FIGS. 14-15, the BMS 144 may utilize single channel heater control (FIG. 14) or a multi-channel heater control (FIG. 15). For example, as shown in FIG. 14, such a system may be utilized with an existing BMS and therefore does not require new BMS hardware or software. Further, each heater electrical resistance (e.g. R1, R2, R3, R4, R5, and R6) can be tuned such that the cell pack temperature gradient is minimal during float condition, which is needed when only single-channel heater control is used, e.g. as shown in FIG. 14. Alternatively, as shown in FIG. 15, the BMS 144 may be upgraded with new hardware and software that enables the cell pack temperature gradient to be customized for each operating condition of the energy storage device 142. For example, during battery float, the battery cell temperature should be maintained at a predetermined temperature (e.g. at about 300 degrees Celsius (° C.)). In contrast, during discharge and recharge of the energy storage device 142, the cells 162 need to be cooled using external air. As such, during warm-up, the BMS 144 may be configured to tune the electrical power to the top heater 181 (e.g. R1) to a 100% power level and the electrical power to the bottom heater 183 (e.g. R5) to a 50% power level to increase the temperature gradient of the cell pack. Further, as mentioned, the heat flux components 182 can be controlled to minimize the temperature gradient during float. In addition, during discharge, the BMS 144 can control the heat flux components 182 to minimize the temperature gradient by having certain heat flux components counteract cooling air temperature gradient effects.

Referring particularly to FIG. 17, the location of the temperature sensors 173, 174, 175, 176, 177, 178 (and therefore the measurement point for the temperature) may include any location near the heat flux components 182 so as to provide stability for the heater control algorithm. As such, in certain embodiments, it is advantageous to locate the temperature sensors away from the heat flux components 182 rather than directly on the heat flux components 182. For example, as shown, the right and left temperature sensors 174, 175 are located at a distance of about 5% to about 10% of a cell pack length away from their respective heater. In addition, as shown, the top and bottom sensors 173, 177 may be located up to about one cell length from their respective heater 182. Such locations are provided for example purposes only and it should be understood that any combination of locations can be utilized so as to provide stability for heater control algorithm.

In additional embodiments, the BMS 144 can also control the heat flux components 182 to extend to guard cooling, e.g. when the interior temperature of the energy storage device 142 is controlled below ambient. In such an embodiment, the heat flux components 182 may include one or more cooling devices, e.g. similar to at least one of a refrigeration evaporation plate, a thermo-electric cooler, a circulated chilled water, or similar on all sides of the external housing 146.

Referring now to FIG. 18, a flow diagram of a method 300 for reducing temperature variability in an energy storage device 142 during various operational stages of the battery is illustrated. As mentioned, the energy storage device 142 includes an inner housing 146 with a plurality of side walls 148 that define an internal volume 149 and a plurality of cells 162 configured within the internal volume 149. Thus, as shown at 302, the method 300 includes placing a plurality of heat flux components 182 within the inner housing 146 of the energy storage device 142. More specifically, the method 300 may also include placing at least one heater 185 with each of the plurality of side walls 148. As shown at 304, the method 300 includes detecting, via one or more temperature sensors, one or more temperatures of the plurality of cells 162 within the inner housing 146. Further, as shown at 306, the method 300 includes controlling, via the BMS 144, the one or more heat flux components during operation of the energy storage device 142 as a function of the detected temperatures.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A heat flux assembly for an energy storage device, the energy storage device having a housing with a plurality of side walls that define an internal volume and a plurality of cells configured within the internal volume, the heat flux assembly comprising:

a plurality of heat flux components configured for arrangement with the side walls of the housing of the energy storage device;

a common negative lead wire electrically coupling each of the plurality of heat flux components to each other and to a power source and a plurality of separate positive lead wires electrically coupling each of the plurality of heat flux components individually and separately to the power source;

one or more temperature sensors configured with each of the plurality of heat flux components, the temperature sensors configured to monitor one or more temperatures at various locations of the plurality of cells; and, a controller configured to adjust a power level of each of the heat flux components as a function of the monitored temperature so as to reduce a temperature gradient across the plurality of cells during operation of the energy storage device.

2. An energy storage system, comprising:

at least one energy storage device, the energy storage device comprising:
- a housing comprising a plurality of side walls that define an internal volume, the plurality of side walls comprising, at least, a bottom side wall and a front side wall, a top side wall, a rear side wall, and opposing side walls;
- a plurality of cells arranged in a matrix within the internal volume atop the bottom side wall and defining a top surface;
- a plurality of heat flux components arranged with each of the plurality of side walls and within the internal volume, the plurality of heat flux components configured to reduce a temperature gradient across the plurality of cells during operation of the energy storage device, wherein at least one heat flux component is configured with each of the plurality of side walls; and
- a common negative lead wire electrically coupling each of the plurality of heat flux components to each other and to a power source and a plurality of separate positive lead wires electrically coupling each of the plurality of heat flux components individually and separately to the power source.

3. The energy storage system of claim 1, wherein the heat flux components further comprise at least one of heaters, cooling devices, or combinations thereof.

4. The energy storage system of claim 3, wherein the heaters comprise at least one of a plate heater, a strip heater, or a pocket heater, and wherein the cooling devices comprise at least one of a refrigeration evaporation plate, a thermoelectric cooler, or a circulated chilled water.

5. The energy storage system of claim 4, wherein each of the heaters is constructed, at least in part, of one or more electrical insulation plates.

6. The energy storage system of claim 5, wherein the heaters further comprise at least one heating wire mounted on one of the electrical insulation plates.

7. The energy storage system of claim 6, wherein the heating wires further comprise a nichrome heating ribbon.

8. The energy storage system of claim 5, wherein the one or more electrical insulation plates are constructed, at least in part, of mica.

9. The energy storage system of claim 5, wherein one or more of the electrical insulation plates comprise one or more perforations configured to allow airflow within the energy storage device.

10. The energy storage system of claim 1, wherein the plurality of lead wires are electrically coupled to the heating wires of each of the heat flux components.

11. The energy storage system of claim 1, wherein the energy storage device further comprises one or more temperature sensors configured with the plurality of heat flux components, the temperature sensors configured to monitor one or more temperatures at various locations of the plurality of cells.

12. The energy storage system of claim 11, further comprising a controller configured to adjust a power level to each of the heat flux components as a function of the monitored temperature.

* * * * *